(12) United States Patent
Scoparo et al.

(10) Patent No.: US 11,480,226 B2
(45) Date of Patent: Oct. 25, 2022

(54) BRAKE DISC ARRANGEMENT FOR A VEHICLE

(71) Applicant: Volvo Truck Corporation, Gothenburg (SE)

(72) Inventors: Luciano Scoparo, Gothenburg (SE); Ingemar Dagh, Gothenburg (SE); Kent Augustsson, Bollebygd (SE); Tobias Andersson, Torslanda (SE)

(73) Assignee: Volvo Truck Corporation, Gothenburg (SE)

( * ) Notice: Subject to any disclaimer, the term of this patent is extended or adjusted under 35 U.S.C. 154(b) by 86 days.

(21) Appl. No.: 17/041,668

(22) PCT Filed: Mar. 26, 2018

(86) PCT No.: PCT/EP2018/025070
§ 371 (c)(1),
(2) Date: Sep. 25, 2020

(87) PCT Pub. No.: WO2019/185105
PCT Pub. Date: Oct. 3, 2019

(65) Prior Publication Data
US 2021/0010551 A1 Jan. 14, 2021

(51) Int. Cl.
*F16D 65/12* (2006.01)
*F16D 65/02* (2006.01)

(52) U.S. Cl.
CPC .... *F16D 65/123* (2013.01); *F16D 2065/1348* (2013.01); *F16D 2065/1376* (2013.01);
(Continued)

(58) Field of Classification Search
CPC ............................................ F16D 65/123–128
(Continued)

(56) References Cited

U.S. PATENT DOCUMENTS

| | | | |
|---|---|---|---|
| 11,131,353 B2* | 9/2021 | Scoparo | F16D 65/123 |
| 2012/0247881 A1* | 10/2012 | Root | F16D 65/123 |
| | | | 188/18 A |

(Continued)

FOREIGN PATENT DOCUMENTS

| | | |
|---|---|---|
| CN | 2429685 Y | 5/2001 |
| CN | 103547461 A | 1/2014 |

(Continued)

OTHER PUBLICATIONS

International Search Report and Written Opinion for PCT/EP2018/025070, dated Dec. 14, 2018, 9 pages.

(Continued)

*Primary Examiner* — Christopher P Schwartz
(74) *Attorney, Agent, or Firm* — Withrow & Terranova, PLLC

(57) ABSTRACT

The brake disc arrangement (10) comprises a brake disc (20) which extends annularly about an axially extending central axis and defines an inwardly facing circumference comprising a splined portion for transferring torques between the brake disc (20) and a corresponding hub, when the brake disc arrangement (10) is mounted to the hub. The brake disc arrangement further comprises a spring assembly (30) adapted to be axially connected to the corresponding hub. The inwardly facing circumference of the brake disc (20) comprises one or more cavities (24), each cavity (24) being defined by axially opposing lateral walls (26). The spring assembly (30) is partially contained in said one or more cavities (24), such that a portion of the spring assembly (30) may abut each one out of the axially opposing lateral walls (26).

11 Claims, 11 Drawing Sheets

(52) U.S. Cl.
CPC ............... *F16D 2065/1384* (2013.01); *F16D 2065/1392* (2013.01); *F16D 2250/0084* (2013.01)

(58) Field of Classification Search
USPC .................................................... 188/218 XL
See application file for complete search history.

(56) References Cited

U.S. PATENT DOCUMENTS

| | | | |
|---|---|---|---|
| 2012/0247884 A1 | 10/2012 | Root et al. | |
| 2015/0219167 A1* | 8/2015 | Kramm | B60K 6/442 |
| | | | 192/48.618 |
| 2016/0298706 A1* | 10/2016 | Rau, III | F16D 65/123 |
| 2017/0074335 A1* | 3/2017 | Wagner | F16D 65/123 |
| 2017/0074337 A1* | 3/2017 | Borner | F16D 65/123 |
| 2018/0180123 A1* | 6/2018 | Rankin | F16D 65/123 |
| 2018/0238404 A1* | 8/2018 | Ince | F16D 15/00 |
| 2021/0148425 A1* | 5/2021 | Scoparo | B60B 27/0052 |

FOREIGN PATENT DOCUMENTS

| | | | | |
|---|---|---|---|---|
| CN | 107076230 A | | 8/2017 | |
| DE | 3216108 A1 | | 12/1982 | |
| DE | 102004057752 A1 | | 6/2005 | |
| GB | 2150263 A | * | 6/1985 | ........... F16D 65/126 |
| GB | 2451880 A | | 2/2009 | |
| JP | 2005291336 A | | 10/2005 | |

OTHER PUBLICATIONS

International Preliminary Report on Patentability for PCT/EP2018/025070, dated Mar. 26, 2020, 12 pages.
First Office Action for Chinese Patent Application No. 201880089439.2, dated Jan. 18, 2022, 11 pages.

* cited by examiner

BRAKE DISC ARRANGEMENT FOR A VEHICLE

RELATED APPLICATIONS

This application is a 35 USC 371 national phase filing of International Application No. PCT/EP2018/025070, filed Mar. 26, 2018, the disclosure of which is incorporated herein by reference in its entirety.

TECHNICAL FIELD

The invention relates to a brake disc arrangement for a vehicle comprising a brake disc extending annularly about an axially extending central axis and defining an inwardly facing circumference comprising a splined portion for transferring torques between the brake disc and a corresponding hub, when the brake disc arrangement is mounted to the hub; and a spring assembly adapted to be axially connected to the corresponding hub. Moreover, the present invention relates to a brake disc assembly comprising a brake disc and a hub. Finally, the present invention relates to a method for assembling a brake disc arrangement for a vehicle, as well as to a vehicle.

The invention can be applied in heavy-duty vehicles, such as trucks, buses and construction equipment. Although the invention will be described with respect to a truck, the invention is not restricted to this particular vehicle, but may also be used in other vehicles such as a bus or working machine.

BACKGROUND OF THE INVENTION

A brake disc arrangement may be used in various positions in a vehicle, wherein a brake disc is arranged for transferring torques between the brake disc and a corresponding hub to which the brake disc is mounted. Conventionally, the brake disc comprises a splined portion for connection to a corresponding portion of the hub. Further, the brake disc arrangement may comprise a spring assembly adapted to be axially connected to the corresponding hub.

The spring assembly may comprise a plurality of disc spring elements, the number of spring elements being dependent on the brake disc size.

A known solution for arranging the spring assembly at the brake disc utilizes a retaining ring arranged opposite the disc springs. This solution requires a groove on the hub for assembly of the retaining ring. Such a groove is disadvantageous since it tends to be subject to corrosion and/or the assembly of debris, meaning that it requires cleaning if the brake disc is to be replaced and a new brake disc is to be arranged to the hub.

Other existing solutions do not require a groove on the huh, but instead lack stopping features in an axial direction, which implies increased complexity when assembling a brake disc to the hub.

As such, it would be desirable to improve the brake disc arrangement comprising a spring assembly.

SUMMARY OF THE INVENTION

An object of the invention is to provide a brake disc arrangement comprising a spring assembly, which provides for facilitated assembly of the brake disc arrangement.

This object is achieved by a brake disc arrangement according to claim 1.

As such, the present invention relates to a brake disc arrangement for a vehicle. The brake disc arrangement comprises a brake disc which extends annularly about an axially extending central axis and defines an inwardly facing circumference. The inwardly facing circumference comprises a splined portion for transferring torques between the brake disc and a corresponding hub, when the brake disc arrangement is mounted to the hub. The brake disc arrangement further comprises a spring assembly adapted to be axially connected to the corresponding hub.

According to the present invention, the inwardly facing circumference of the brake disc comprises one or more cavities, each cavity being defined by axially opposing lateral walls. The spring assembly is partially contained in said one or more cavities, such that a portion of the spring assembly may abut each one out of the axially opposing lateral walls.

The spring assembly being partially contained in the one or more cavities such that a portion of the spring assembly may abut each one out of the axially opposing lateral walls enables simple connection of the spring assembly to the brake disc.

The spring assembly being partially contained in the one or more cavities of an inwardly facing circumference of the brake disc implies that no outer groove or similar structure being susceptible to corrosion and/or debris collection is required by the brake disc arrangement.

The brake disc assembly comprising the brake disc and the spring assembly being partially contained in the one or more cavities of the brake disc implies that the brake disc assembly may be provided as a single unit part or a single replacement part to be mounted to a corresponding hub.

Optionally, the spring assembly is partially retained in said one or more cavities by a spring force exerted by said spring assembly towards the lateral walls of the one or more cavities. This implies that the resilient properties inherent in the spring assembly may be used for connecting the spring assembly to the brake disc. This in turn provides for easy assembly of the brake disc arrangement.

Preferably, the spring assembly is partially retained in said one or more cavities only by the spring force exerted by said spring assembly towards the lateral walls of the one or more cavities.

Optionally, displacement of the spring assembly in axial directions relative to the brake disc is prevented by the axially opposing lateral walls.

Optionally, a portion of the spring assembly, which is adapted to be retained in the one or more cavity, has an axial extension when in a relaxed state. This axial extension may be greater than the axial extension of the one or more cavity, such that when the portion of the spring assembly is contained in the one or more cavity, the spring assembly is compressed so as to exert a spring force retaining the spring assembly in the one or more cavities.

Optionally, the spring assembly comprises a connection portion which extends radially towards the axially extending central axis from the inwardly facing circumference of the brake disc. The connection portion is adapted to be axially connected to the corresponding hub.

Optionally, the connection portion of the spring assembly defines axial holes for connection of the spring assembly to the corresponding hub.

Optionally, the spring assembly defines one or more gaps or slits extending radially outwards from an inner circumference of the spring assembly.

Optionally, the spring assembly comprises a plurality of spring elements. In this configuration, the plurality of spring elements may be separated by gaps.

Alternatively, the spring assembly comprises an annular spring element.

Optionally, said spring assembly is formed from a sheet material, the sheet material being shaped so as to provide a portion of the spring assembly, adapted to be retained in the one or more cavity, with an axial extension. In this configuration, the axial thickness may naturally be greater than a nominal thickness of the sheet material. For example, the sheet material may be bent to as to provide a desired axial thickness.

Optionally, said spring assembly is formed by a resilient material.

A second aspect of the present invention relates to a method for assembling a brake disc arrangement for a vehicle. The brake disc arrangement comprises a brake disc extending annularly about an axially extending central axis and defining an inwardly facing circumference comprising one or more cavities. The method comprises:

introducing a portion of the spring assembly having a first axial extension into the cavity of the brake disc, and increasing the axial extension of said portion of the spring assembly.

A third aspect of the invention relates to a brake disc assembly comprising a brake disc and a hub, said brake disc and hub being rotationally connected to each other via a torque transferring assembly. The brake disc and the hub are further being axially connected to each other via a spring assembly being distinct from the torque transferring assembly. A portion of said spring assembly is contained in one or more cavities in one of the brake disc and the hub, such that displacement of the spring assembly in axial directions is prevented relative to the cavity containing component, and the spring assembly is rigidly connected to the other one of the brake disc and hub.

Optionally, the torque transferring assembly comprises a splined portion of the brake disc and a corresponding splined portion of the huh.

A fourth aspect of the invention relates to a vehicle, preferably a heavy duty vehicle such as a truck, comprising a brake disc arrangement according to the first aspect of the invention and/or a brake disc assembly according to the third aspect of the invention.

It will be understood that features and advantages described herein in relation to the first aspect of the invention are equally applicable to the second, third and fourth aspect of the invention.

Further features of, and advantages with, the present invention will become apparent when studying the appended claims and the following description. The skilled person will realise that different features of the present invention may be combined to create embodiments other than those described in the following, without departing from the scope of the present invention.

BRIEF DESCRIPTION OF THE DRAWINGS

With reference to the appended drawings, below follows a non-limiting more detailed description of embodiments of the invention cited as examples.

In the drawings:

FIG. 3b is an enlarged view of FIG. 3a;

FIG. 7b is an exploded view showing the parts of the brake disc assembly of FIG. 7a;

DETAILED DESCRIPTION OF PREFERRED EMBODIMENTS

Figure 1:
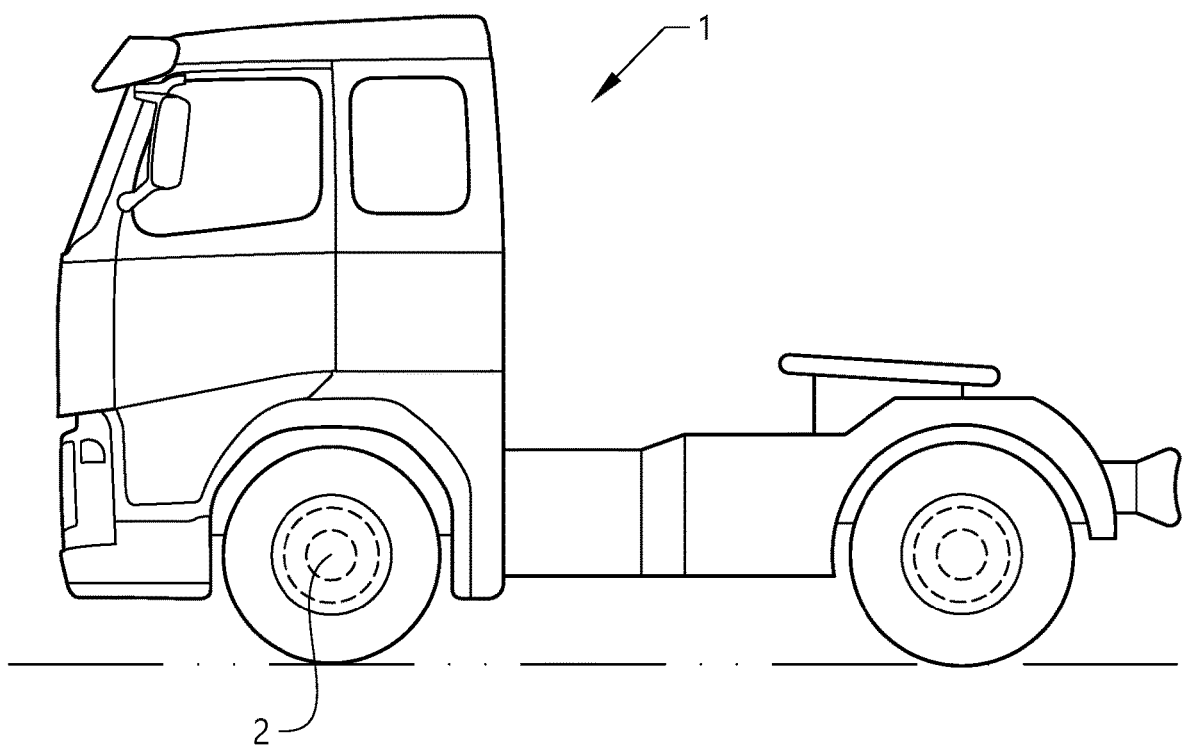
FIG. 1 is a schematic view of a vehicle.

The present invention will now be described more fully with reference to the accompanying drawings, in which exemplary embodiments of the invention are shown. The invention may however be embodied in many different forms and should not be construed as limited to the embodiments set forth herein; rather the embodiments are provided for thoroughness and completeness. Like reference characters refer to like elements throughout the description.

The invention will be described below for a vehicle in the form of a truck 1 such as the truck illustrated in FIG. 1. The truck 1 should be seen as an example of a vehicle which could comprise a brake disc arrangement and/or a brake disc assembly according to the present invention.

However, the present invention may be implemented in a plurality of different types of vehicles. Purely by way of example, the present invention could be implemented in a truck, a tractor, a car, a bus, a work machine such as a wheel loader or an articulated hauler, or any other type of construction equipment.

Figure 2:
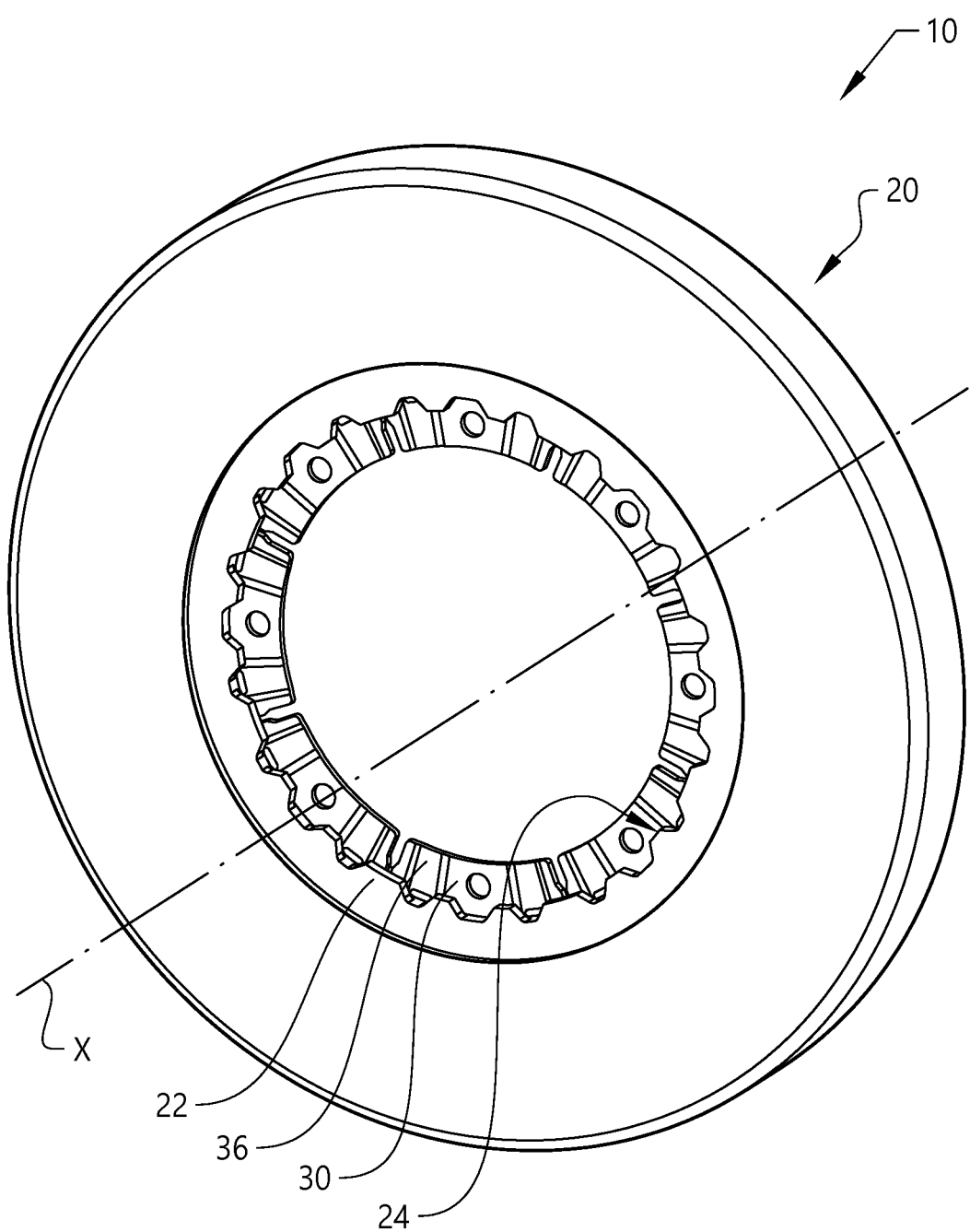
FIG. 2 is a perspective view of an embodiment of a brake disc arrangement.

The FIG. 1 vehicle comprises a brake disc arrangement as illustrated in FIG. 2. A vehicle 1 may comprise one or more brake disc arrangements for example in connection with wheel suspension and/or drive arrangements 2.

Figure 7A:
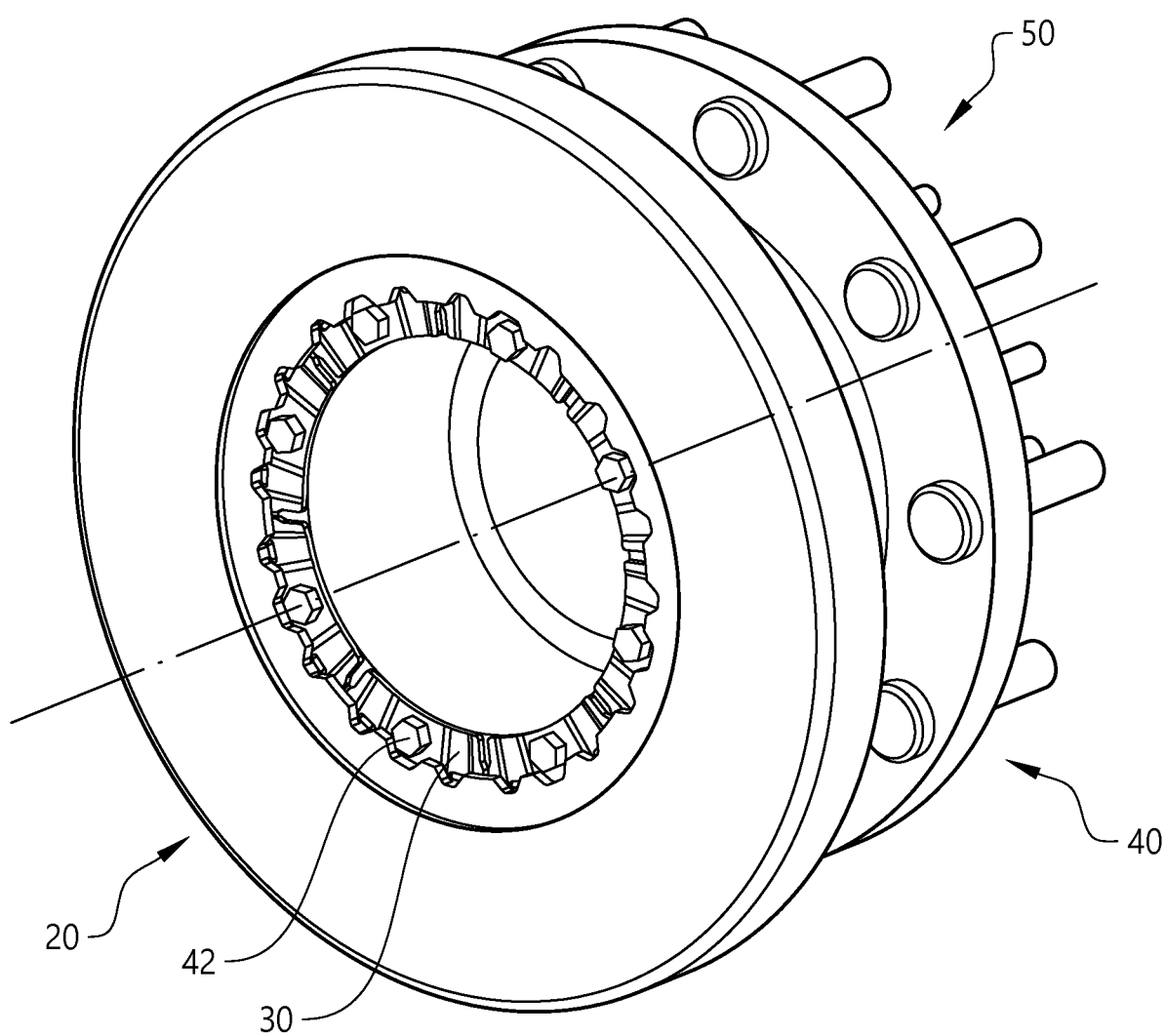
FIG. 7a is a perspective view of an embodiment of a brake disc assembly.
Figure 7B:
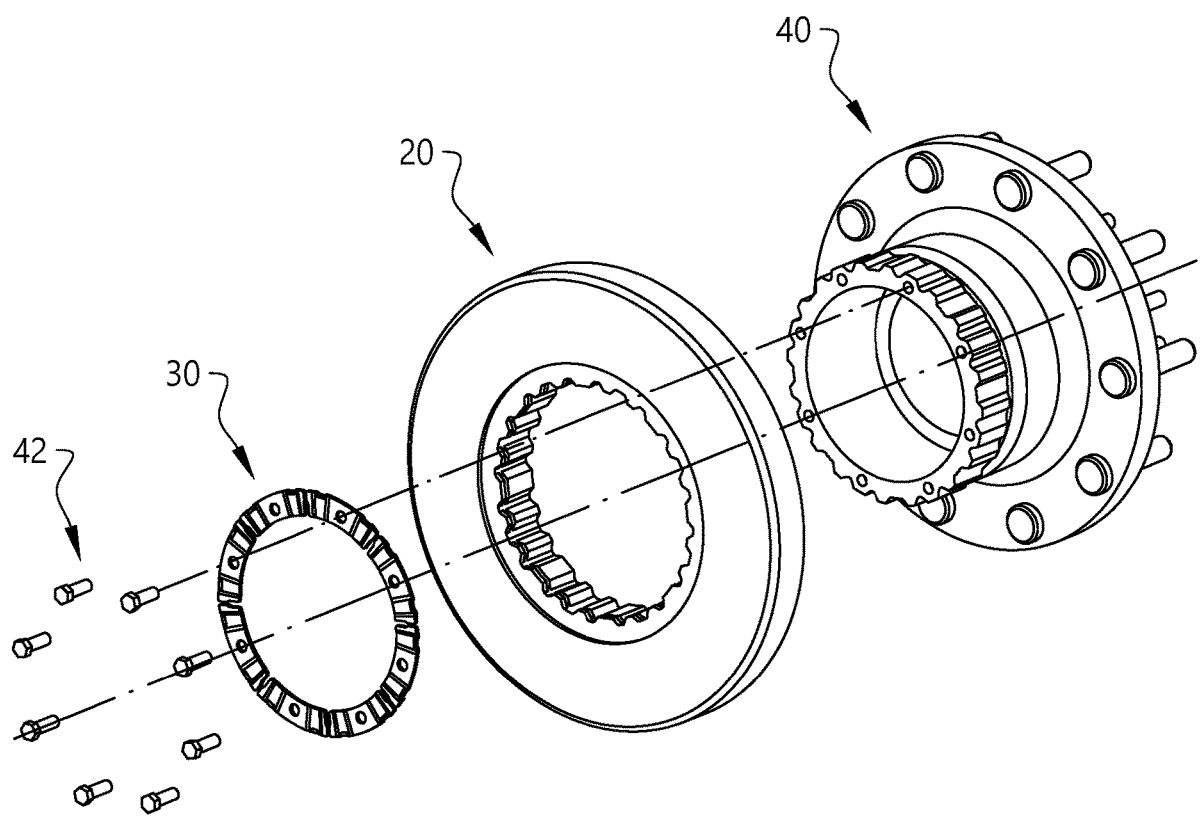

FIG. 2 is a perspective view of an embodiment of a brake disc arrangement 10 for a vehicle. The brake disc arrangement 10 comprises a brake disc 20 extending annularly about an axially extending central axis X. The brake disc 20 defines an inwardly facing circumference comprising a splined portion 22 for transferring torques between the brake disc 20 and a corresponding hub 40 (see e.g. FIGS. 7a and b) when the brake disc arrangement 10 is mounted to the hub 40. The brake disc arrangement further comprises a spring assembly 30 adapted to be axially connected to the corresponding hub 40.

Figure 3A:
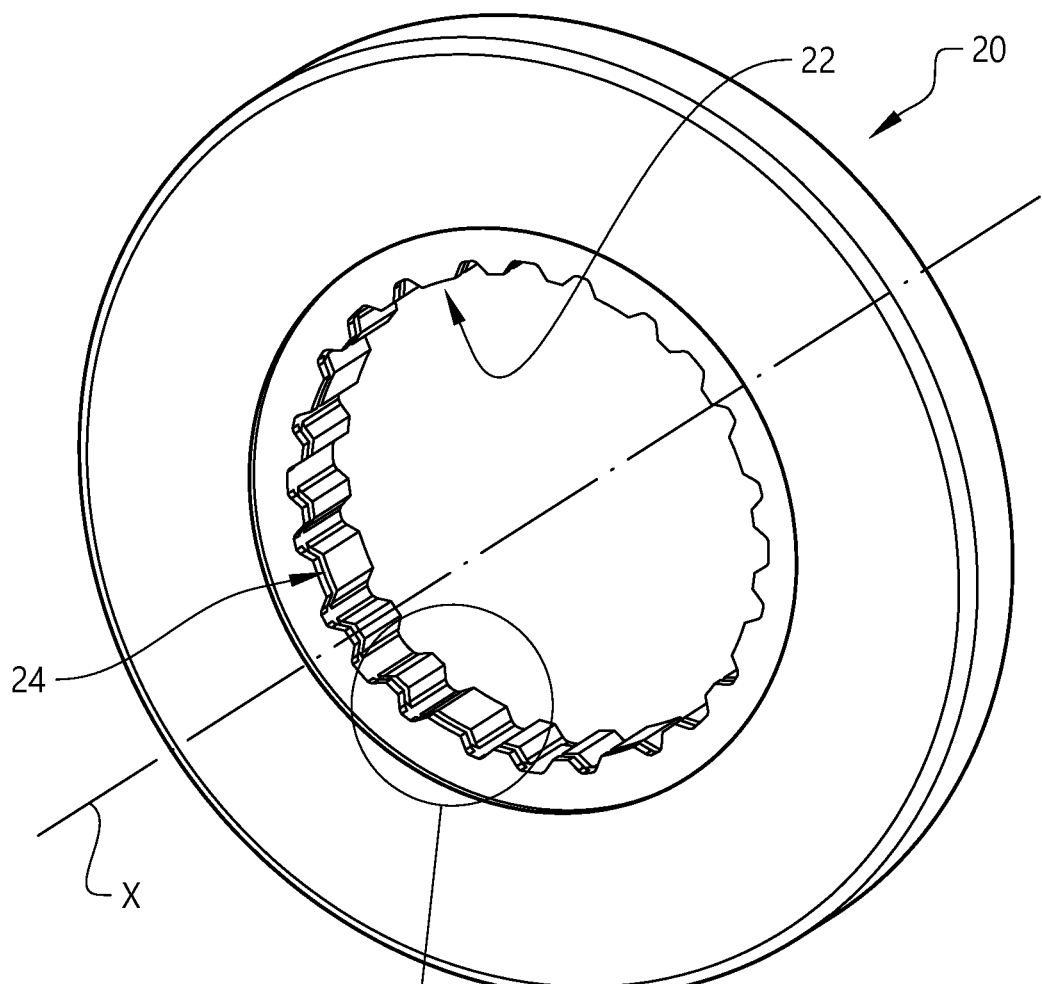
FIG. 3a is a perspective view of an embodiment of a brake disc.
Figure 3B:
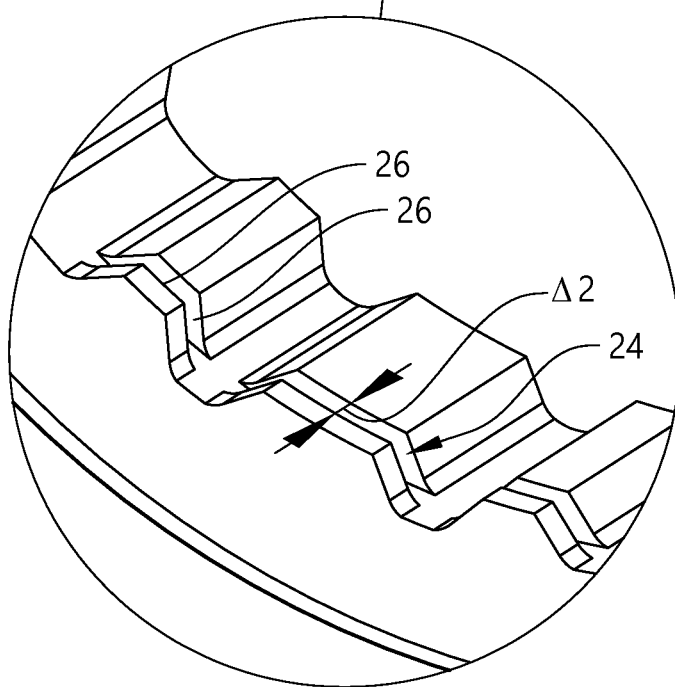

FIGS. 3a and 3b are perspective views of the brake disc 20 in the embodiment of FIG. 2, without the spring assembly 30. The inwardly facing circumference 22 of the brake disc 20 comprises one or more cavities 24.

The cavities 24 may, as in the illustrated embodiment, be formed by a groove extending radially into the brake disc 20 from the inner circumference 22 thereof, and at least partially along the circumference of the brake disc 20.

The cavities 24 may, as in the illustrated embodiment, extend in the teeth of a splined portion of the brake disc 20.

In this case, the cavities 24 may extend in a radial direction to a depth corresponding approximately to a radial extension of the teeth.

As seen in FIGS. 3a, 3b each cavity 24 is defined by axially opposing lateral walls 26.

Figure 6:
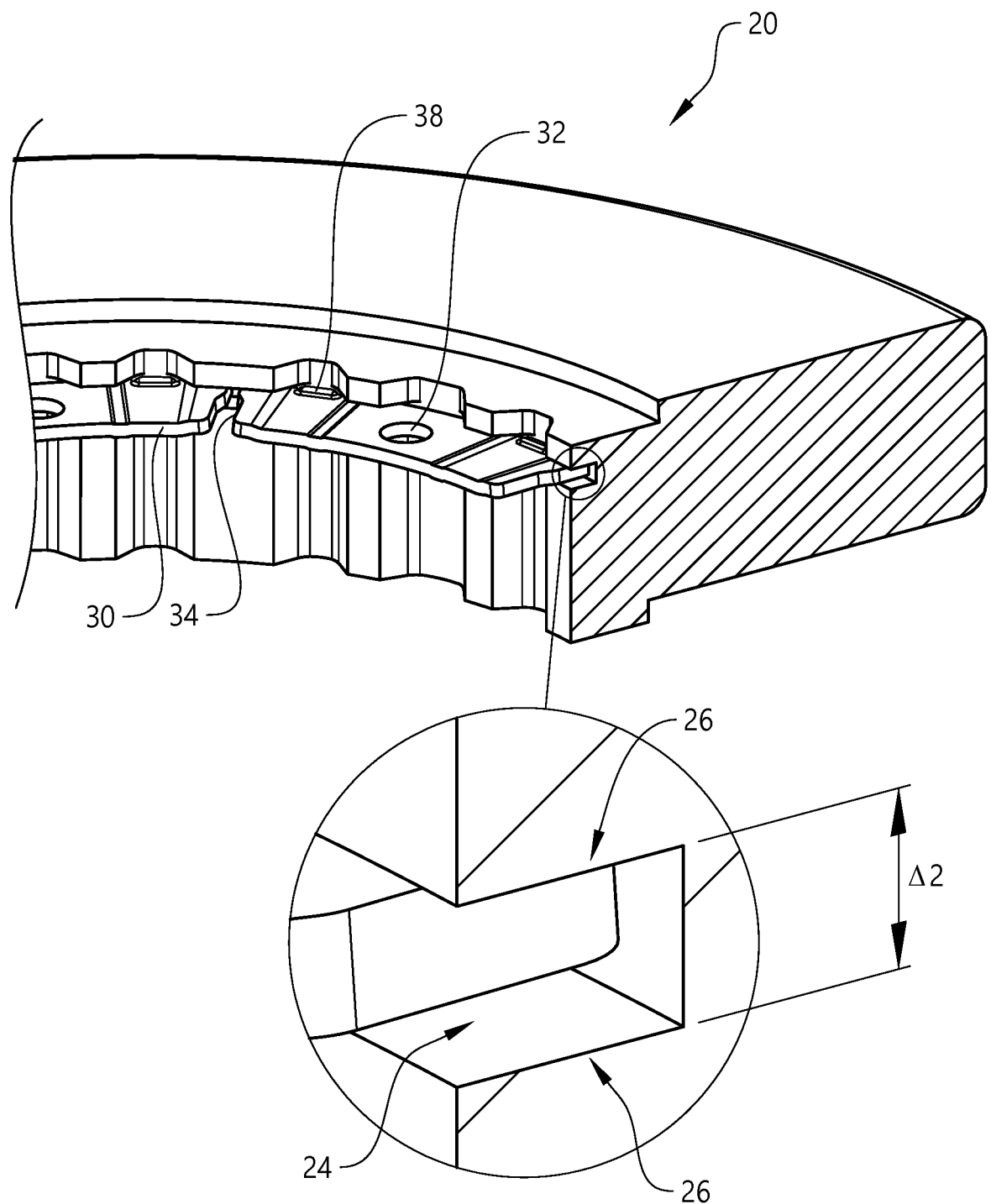
FIG. 6 is a partially cut view of an embodiment of a brake disc arrangement.

As may be best seen in FIG. 6, the spring assembly 30 is partially contained in said one or more cavities 24, such that a portion of the spring assembly 30 may abut each one out of the axially opposing lateral walls 26.

In the illustrated embodiment, the spring assembly 30 is partially retained in said one or more cavities 24 by a spring force exerted by said spring assembly 30 towards the lateral walls 26 of the one or more cavities 24.

In the illustrated embodiment, the spring assembly 30 is connected to the brake disc 20 by means of the spring force exerted by said spring assembly 30 towards the lateral walls 26 of the one or more cavities 24 only. Accordingly, the spring assembly 30 and the cavity 24 alone are sufficient to enable retention of the spring assembly 30 in the cavity 24, i.e. no additional retention means are required.

As may be gleaned from FIG. 6, displacement of the spring assembly 30 in axial directions relative to the brake disc 20 is prevented by the axially opposing lateral walls 26.

Figure 4:
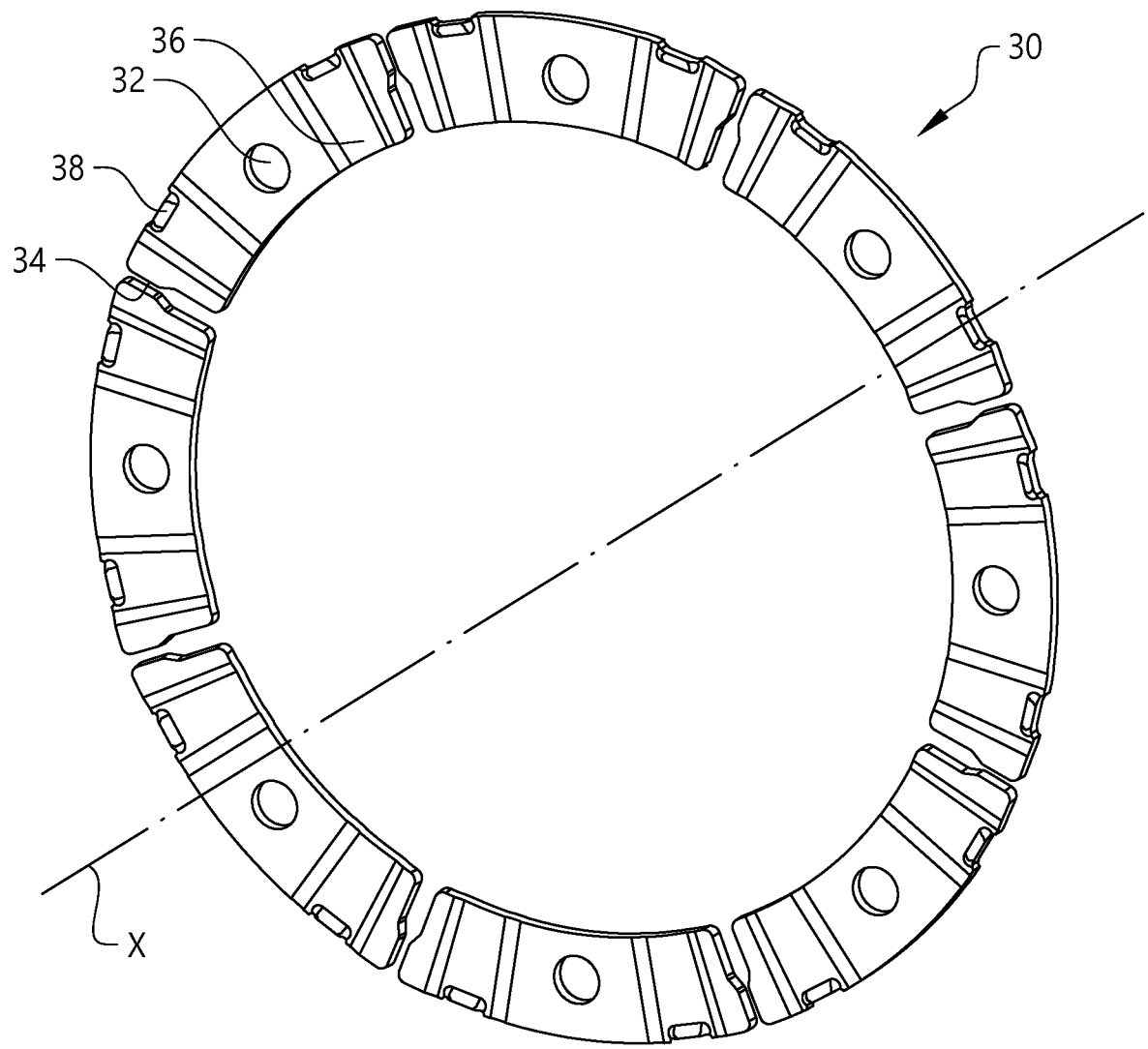
FIG. 4 is a perspective view of an embodiment of a spring assembly.

FIG. 4 is a perspective view of an embodiment a spring assembly 30. The spring assembly 30 comprises a plurality of spring elements. The plurality of spring elements is adapted to be arranged along the inner circumference of the brake disc 20. Each spring element is preferably arc shaped, and intended to be arranged along a circular sector of the inner circumference of the brake disc 20. As may be gleaned from FIG. 4, the majority of the extension of the inner circumference of the brake disc 20 will be provided with a spring element.

In the illustrated embodiment, eight spring elements are provided to form the spring assembly 30. However, the number of spring elements 30 may naturally be adapted e.g. to the size and shape of the brake disc and/or hub.

That the spring assembly 30 comprises a plurality of spring elements may be advantageous in that it enables one spring element at the time to be arranged to the brake disc in simple manner.

However, other embodiments may be envisaged, wherein the spring assembly 30 instead comprises an annular spring element.

When arranged to the brake disc 20, the plurality of spring elements will form gaps 34 between them, i.e. there will be gaps 34 in the spring assembly 30.

Optionally or in addition to the gaps, slits may be provided so as to extend radially outwards from an inner circumference of the spring assembly 30. Such slits may be formed by a cut-out in an individual spring element.

With reference e.g. to FIGS. 2 and 6, the spring assembly 30 comprises a connection portion 36 which extends radially towards the axially extending central axis X from the inwardly facing circumference of the brake disc 20. The connection portion 36 is adapted to be axially connected to the corresponding hub 40. Hence, the connection portion 36 of the spring assembly 30 may comprise various features suitable for enabling the connection to a hub.

In particular, and as in the illustrated embodiment, the connection portion 36 of the spring assembly 30 may define a plurality of axial holes 32 for connection of the spring assembly 30 to the corresponding hub 40. Advantageously, each spring element out of the plurality of spring elements may comprise at least one axial hole 32. In the illustrated embodiment, each spring element out of the plurality of spring elements comprises exactly one axial hole 32.

Figure 5A:
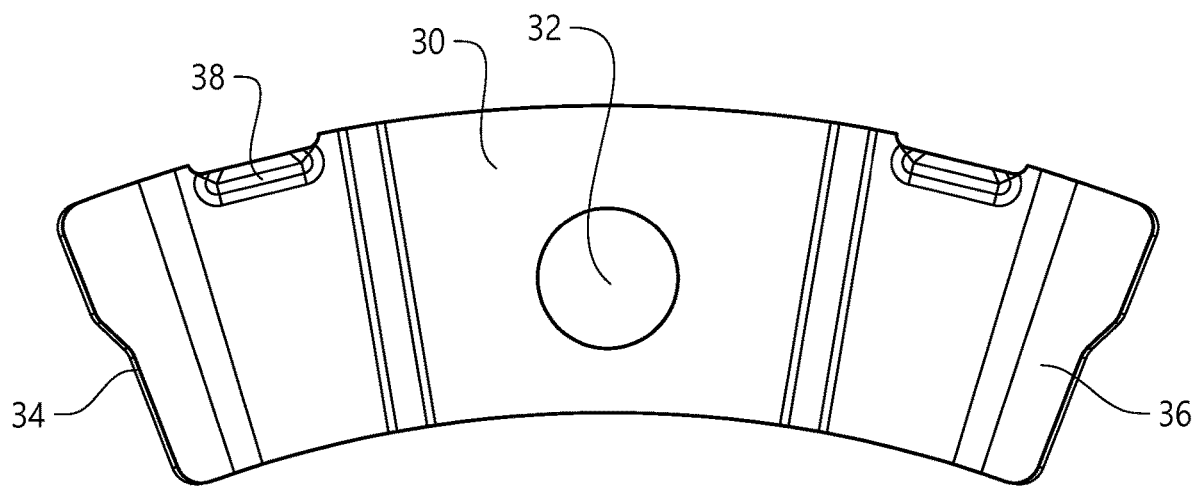
FIGS. 5a and 5b are views of a portion of the spring assembly of FIG. 4.
Figure 5B:
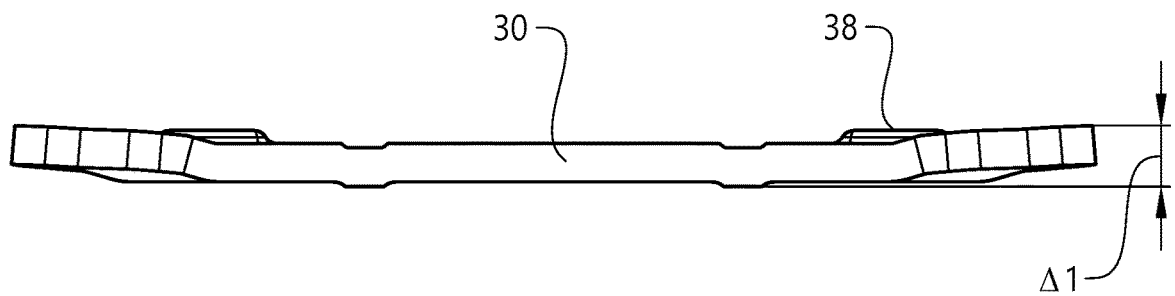

FIGS. 5a and 5b illustrate a single spring element of the spring assembly 30 in greater detail. In FIGS. 5a and 5b, the spring element is shown in a relaxed state. A portion of the spring assembly 30 which is adapted to be retained in the one or more cavity 24, has an axial extension Δ1, when in a relaxed state.

It will be understood that a portion of the spring assembly 30 which is adapted to be retained in the one or more cavity 24, is a portion located at or adjacent the outer circumference of the spring element (as seen in radial direction from the central axis X).

The axial extension Δ1 of the spring assembly may be selected so as to be greater than the axial extension Δ2 of the one or more cavity 24 (FIG. 6). This means that when the portion of the spring assembly 30 is contained in the one or more cavity 24, the spring assembly 30 will be in a compressed state. Accordingly, the spring assembly 30 will exert a spring force, retaining the spring assembly 30 in the one or more cavity 24.

As may be gleaned from FIG. 6, the axial extension Δ2 of the one or more cavity 24 is the axial distance between the lateral walls 26 of said cavity 24.

In the FIG. 5a, 5b embodiment, the portion of the spring element which is to be introduced into the cavity is provided with protrusions 38. The protrusions 38 may act to ensure contact abutment between the spring assembly 30 and the lateral sides 26 of the cavity 24.

The spring assembly 30 in the illustrated embodiments is formed from a sheet material. The sheet material is shaped so as to provide a portion of the spring assembly 30 adapted to be retained in the one or more cavity 34 with an axial extension Δ1. As may be gleaned from FIG. 5b, the axial extension Δ1 of the spring assembly 30 is greater than a nominal thickness of the sheet material.

Moreover, the spring assembly 30 is formed by a resilient material. Preferably, the spring assembly 30 is formed by a metal material.

Also, there is provided a brake disc assembly comprising a brake disc 20 and a hub 40, said brake disc 20 and hub 40 being rotationally connected to each other via a torque transferring assembly. The brake disc 20 and the hub 40 are further axially connected to each other via a spring assembly 30 being distinct from the torque transferring assembly. A portion of said spring assembly 30 is contained in one or more cavities 24 in one of the brake disc 20 and the hub 30, such that displacement of the spring assembly 30 in axial directions is prevented relative to the cavity containing component, the spring assembly 30 being rigidly connected to the other one of the brake disc 20 and hub 40.

The torque transferring assembly may advantageously comprise a splined portion of the brake disc 20 and a corresponding splined portion of the hub 40.

Features and advantages described in the above relation to the brake disc arrangement may be applied also to the brake disc assembly.

Although the brake disc assembly in the above has been described with reference to a brake disc comprising a spring assembly, it will be understood that the spring assembly may instead be arranged to the hub.

Figure 9:
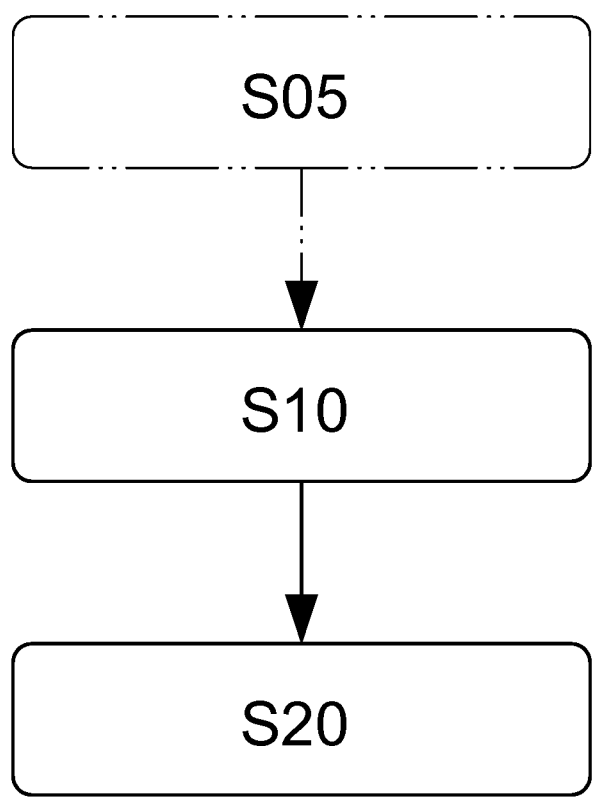
FIG. 9 is a flow chart illustrating an embodiment of a method for manufacturing a spring assembly.

FIG. 9 illustrates an embodiment of a method for assembling a brake disc arrangement for a vehicle, the brake disc arrangement comprising a brake disc 20 extending annularly about an axially extending central axis X, and defining an inwardly facing circumference comprising one or more cavities 24. The method comprises S10 introducing a portion of the spring assembly having a first axial extension into the cavity 24 of the brake disc 20, and S20 increasing the axial extension of said portion of the spring assembly.

Optionally, the method may additionally comprise a step performed prior to said step (S10) of introducing a portion of the spring assembly having a first axial extension into the cavity 24 of the brake disc 20, namely S05 compressing a portion of the spring assembly 30 in an axial direction so as to achieve a first axial extension, In the step S20 of increasing the radial extension of said portion of the spring assembly 30, the increase may be made at least so as to achieve a second axial extension Δ2 corresponding to the axial extension of the cavity 24, such that the portion of the spring assembly 30 may abut the lateral walls 26 of the cavity 24.

Figure 8A:
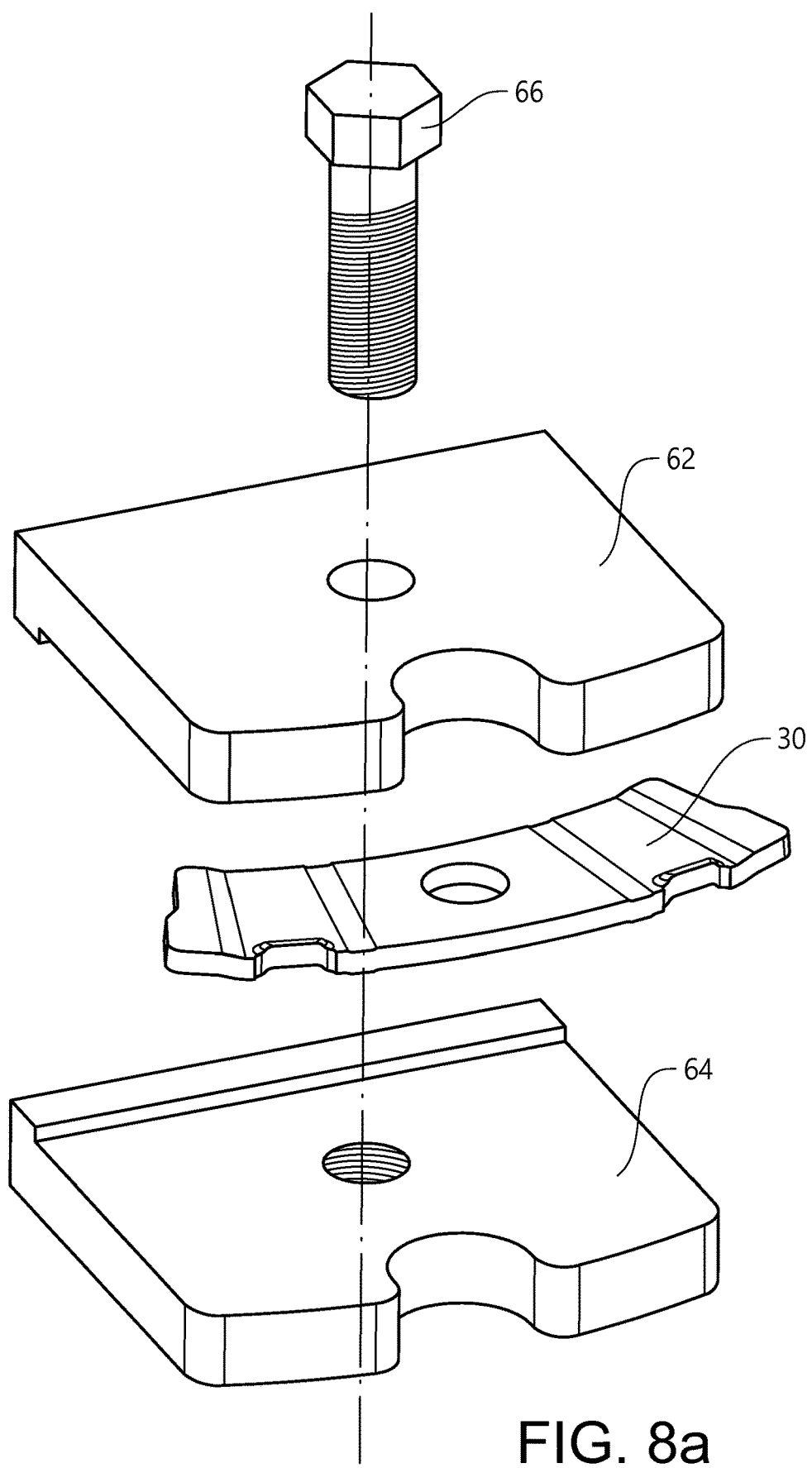
FIGS. 8a to 8c are perspective views of an embodiment of a tool for use in an embodiment of a method for assembling a brake disc arrangement.
Figure 8B:
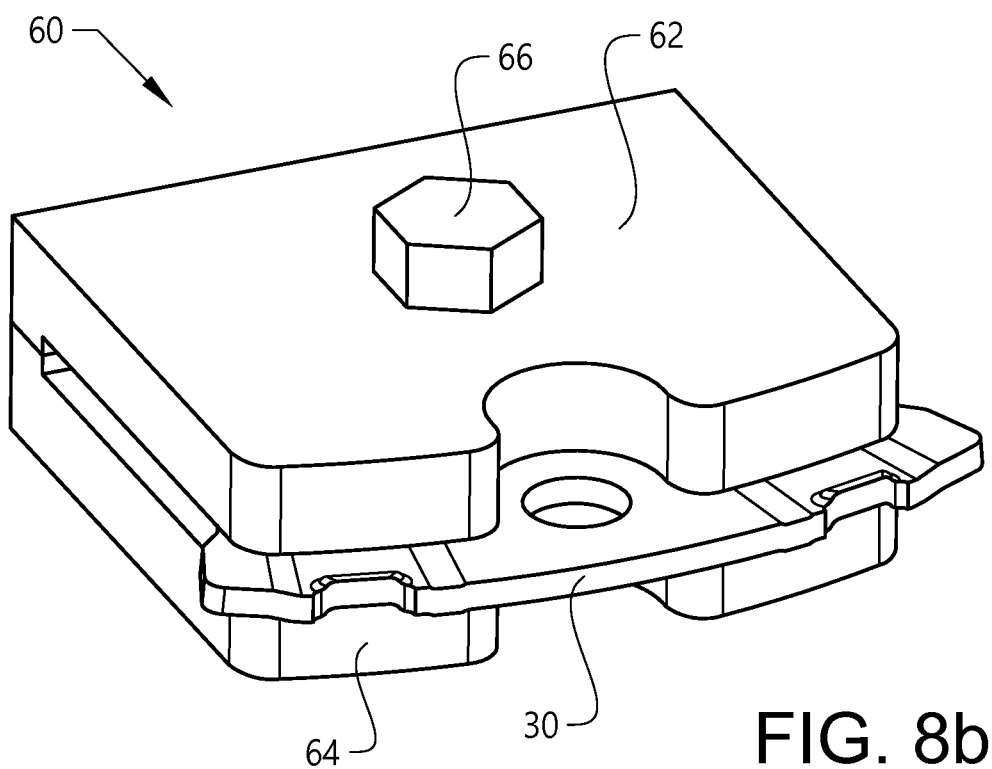
Figure 8C:
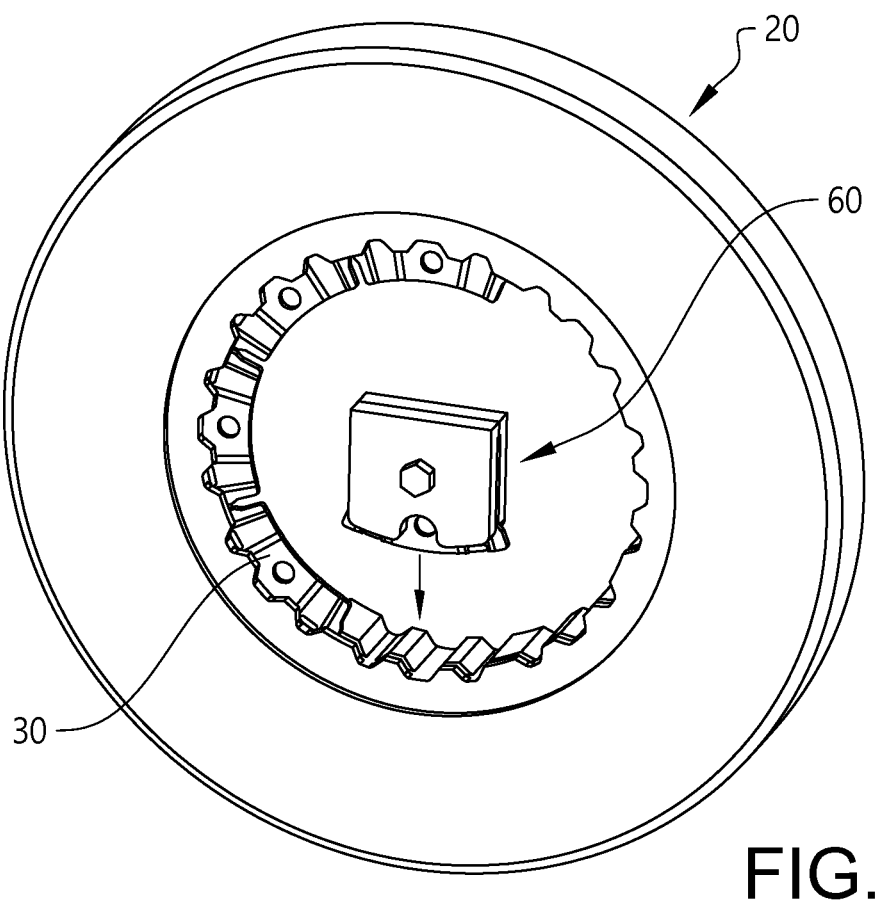

FIGS. 8a to 8c are perspective schematic views of a tool 60 to be used for compressing the spring assembly 30 (S05). The tool 60 comprises a first support 62 and a second support 64, and a control arrangement 66 for adjusting a distance between the first support 62 and the second support 64. In use, at least a portion of the spring assembly 30, or preferably of an individual element of the spring assembly 30 is positioned between the first support 62 and the second support 63. The control arrangement 66 is used for diminishing the distance between the first and the second supports 62, 63, while compressing the portion of the spring assembly 30 between them. Accordingly, the tool may be used to compress a portion of the spring assembly 30 from its initial relaxed axial extension Δ1 to a new axial direction being equal to or less than the axial extension Δ2 of the cavity 24. As illustrated in FIG. 8c, the spring assembly 30 may be introduced into the cavity 24 in its compressed condition, whereafter the tool is released and the spring assembly 30 may expand in the cavity so as to exert a spring force towards the lateral walls thereof.

It is to be understood that the present invention is not limited to the embodiments described above and illustrated in the drawings; rather, the skilled person will recognize that many changes and modifications may be made within the scope of the appended claims.

The invention claimed is:

1. A brake disc arrangement for a vehicle, comprising a brake disc extending annularly about an axially extending central axis and defining an inwardly facing circumference comprising a splined portion configured to transfer torque between the brake disc and a corresponding hub the brake disc arrangement is mounted to; and a spring assembly configured to be axially connected to the corresponding hub wherein:

the inwardly facing circumference of the brake disc comprises one or more cavities, each cavity at least partially defined by axially opposing lateral walls;

the spring assembly is partially contained in the one or more cavities, such that a portion of the spring assembly may abut each of the axially opposing lateral walls; and the spring assembly comprises a connection portion which extends radially towards the axially extending central axis from the inwardly facing circumference of the brake disc, configured to be axially connected to the corresponding hub, wherein the connection portion of the spring assembly defines axial holes for connection of the spring assembly to the corresponding hub.

2. The brake disc arrangement of claim 1, wherein the spring assembly is partially retained in the one or more cavities by a spring force exerted by the spring assembly towards the lateral walls of the one or more cavities.

3. The brake disc arrangement of claim 1, wherein the spring assembly is partially retained in the one or more cavities only by a spring force exerted by the spring assembly towards the lateral walls of the one or more cavities.

4. The brake disc arrangement of claim 1, wherein displacement of the spring assembly in axial directions relative to the brake disc is prevented by the axially opposing lateral walls.

5. The brake disc arrangement of claim 1, wherein a portion of the spring assembly has an axial extension greater in a relaxed state than an axial extension of the one or more cavities, such that the portion of the spring assembly is configured compressed to exert a spring force to retain the spring assembly in the one or more cavities.

6. The brake disc arrangement of claim 1, wherein the spring assembly defines one or more gaps and/or slits extending radially outwards from an inner circumference of the spring assembly.

7. The brake disc arrangement of claim 1, wherein the spring assembly comprises a plurality of spring elements.

8. The brake disc arrangement of claim 1, wherein the spring assembly comprises an annular spring element.

9. The brake disc arrangement of claim 1, wherein the spring assembly is formed from a sheet material shaped to provide a portion of the spring assembly configured to be retained in the one or more cavities with an axial extension.

10. The brake disc arrangement of claim 1, wherein the spring assembly is formed from a resilient material.

11. A method for assembling a brake disc arrangement for a vehicle, the brake disc arrangement comprising a brake disc extending annularly about an axially extending central axis and defining an inwardly facing circumference comprising, a splined portion configured to transfer torque between the brake disc and a corresponding hub the brake disc arrangement is mounted to; and a spring assembly configured to be axially connected to the corresponding hub wherein:

the inwardly facing circumference of the brake disc comprises one or more cavities, each cavity at least partially defined by axially opposing lateral walls;

the spring assembly is partially contained in the one or more cavities, such that a portion of the spring assembly may abut each of the axially opposing lateral walls; and the spring assembly comprises a connection portion which extends radially towards the axially extending central axis from the inwardly facing circumference of the brake disc, configured to be axially connected to the corresponding hub, wherein the connection portion of the spring assembly defines axial holes for connection of the spring assembly to the corresponding hub, the method comprising:

compressing a portion of the spring assembly in an axial direction so as to achieve a first axial extension, introducing the portion of the spring assembly having the first axial extension into the cavity of the brake disc, and uncompressing the portion of the spring assembly such that the portion of the spring assembly assumes a second axial extension being greater than the first axial extension.

* * * * *